US 8,850,390 B2

(12) United States Patent
Eschenroeder et al.

(10) Patent No.: US 8,850,390 B2
(45) Date of Patent: Sep. 30, 2014

(54) STATUS MANAGEMENT FOR PHASED IMPLEMENTATION OF CONFIGURATION CHANGES

(75) Inventors: Klaus Eschenroeder, Karlsruhe (DE); Frank Wagner, Dielheim (DE); Florian Stallmann, Heidelberg (DE); Thomas Vogt, Neustadt (DE)

(73) Assignee: SAP AG, Walldorf (DE)

( * ) Notice: Subject to any disclaimer, the term of this patent is extended or adjusted under 35 U.S.C. 154(b) by 684 days.

(21) Appl. No.: 12/946,306

(22) Filed: Nov. 15, 2010

(65) Prior Publication Data

US 2012/0124553 A1    May 17, 2012

(51) Int. Cl.
    *G06F 9/44*    (2006.01)
(52) U.S. Cl.
    CPC ........................... *G06F 8/71* (2013.01)
    USPC ............................. 717/120; 717/101; 717/102
(58) Field of Classification Search
    None
    See application file for complete search history.

(56) References Cited

U.S. PATENT DOCUMENTS

| 7,424,602 | B2 | 9/2008 | Reiss et al. |
| 7,703,106 | B2 | 4/2010 | Eschenroeder et al. |
| 2007/0038686 | A1 | 2/2007 | Kalthoff et al. |
| 2010/0070556 | A1 | 3/2010 | Heusermann et al. |
| 2010/0070946 | A1 | 3/2010 | Herrmann et al. |
| 2010/0153149 | A1 | 6/2010 | Prigge et al. |
| 2010/0153150 | A1 | 6/2010 | Prigge et al. |
| 2010/0153468 | A1 | 6/2010 | Lange et al. |

OTHER PUBLICATIONS

Robert Hirschfeld, "Contect-Oriented Programming", 2008, JOT.*
Pascal Costanza, "Feature Description for Context-Oriented Programming", 2008, SPLC.*

* cited by examiner

*Primary Examiner* — Lewis A Bullock, Jr.
*Assistant Examiner* — Mark Gooray
(74) *Attorney, Agent, or Firm* — Fish & Richardson P.C.

(57) ABSTRACT

The present disclosure involves systems, software, and computer implemented methods for providing status management for phased implementation of configuration changes. One process includes operations for receiving a selection for a modular software solution and identifying a partial implementation of the modular software solution comprising a subset of the plurality of model entities included in the modular software solution. After the model entities in the subset are activated, a particular model entity is identified to add to the partial implementation. A temporary phase-in state is assigned to the particular model entity, the temporary phase-in state providing an indication to at least one configuration service to perform at least one pre-activation task for the particular model entity. The particular model entity is activated after the pre-activation task is completed.

20 Claims, 7 Drawing Sheets

STATUS MANAGEMENT FOR PHASED IMPLEMENTATION OF CONFIGURATION CHANGES

TECHNICAL FIELD

The present disclosure relates to software, computer systems, and computer implemented methods for providing status management for phased implementation of configuration changes.

BACKGROUND

Business applications, such as Enterprise Resource Planning software, can consist of modular application components that are combinable to meet the needs of a specific business scenario. The application components and the process interactions between the application components can be modeled with the information required for implementation of the model. In some instances, certain application components may initially be combined in a particular configuration, but the configuration may need to be modified later by, for example, adding additional application components or replacing current application components. For example, a business scenario may require only a partial configuration with only a portion of all available application components but may later require a transition into a full configuration with additional application components.

In order to extend the functionality of a software system with application components, however, several tasks must be completed before introducing new application components or replacing application components. For example, configuration settings of the new application components and the master data required within the new application component must be maintained, and associated software processes must be reconfigured to include the new application component. Further, in order to maintain master data, the configuration settings and user interface of the new application component must already be available. Business documents are generally not sent to the new component for processing, however, because the component will not be fully functional unless the preparation steps have been completed. Thus, the addition of application components or the switch to a new process integration is delayed. In some instances, a business downtime may be applied to prepare new application components and to activate new process integrations. During the business downtime, however, the software system may be available for preparation tasks, but locked for other business related activities. Accordingly, many tasks must be delayed to implement a configuration change.

In order to decrease business downtimes, some implementations may move certain preparation tasks to a clone copy of the productive system. The productive system may then continue with normal business activity while the clone system prepares activation of application components and process integration. At the end of the preparation, a downtime is incurred to merge the new data and configuration back to the productive system and to switch to the new process integration. Migrating preparation tasks to a clone system, however, increases the costs of operation and requires extensive additional resources such as master data replication mechanisms and additional maintenance of master data.

Still further, predefined change scenarios may be created, and relevant process integration models are explicitly defined for each of the predefined change scenarios. At configuration time, process integration models belonging to a change scenario are only activated after the preparation phase of the change project is finished. In these implementations, however, business changes to a particular configuration of application components are required to follow the predefined change scenarios.

SUMMARY

The present disclosure describes techniques for providing status management for phased implementation of configuration changes. A computer program product is encoded on a tangible storage medium, where the product comprises computer readable instructions for causing one or more processors to perform operations. These operations can include receiving a selection for a modular software solution and identifying a partial implementation of the modular software solution comprising a subset of the plurality of model entities included in the modular software solution. After the model entities in the subset are activated, a particular model entity is identified to add to the partial implementation. A temporary phase-in state is assigned to the particular model entity, the temporary phase-in state providing an indication to at least one configuration service to perform at least one pre-activation task for the particular model entity. The particular model entity is activated after the pre-activation task is completed.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for providing status management for phased implementation of configuration changes. Modular application components and the process interactions between application components can be configured using model-based configurations for particular business scenarios. Some business scenarios may be associated with a modeled solution requiring a certain combination of application components in a full scope solution. A user may implement only some of the application components in the configuration, however, in a "partial scope solution," and may optionally include the remaining application components at a later time. For example, the user may begin with a partial scope solution with only a portion of the available application components before transitioning into a full scope solution with the entire combination of application components. While the partial scope solution is implemented, the user may, in some instances, implement the remaining application components using legacy components or generic components external to the present system. The user may then choose to add additional components to the partial scope solution, which may require transitioning the additional components and current components to accommodate the new additions to the partial scope solution. In some instances, all remaining application components from the full scope solution can be added to the partial scope solution while in other instances, the partial scope solution is expanded with some but not all, of the remaining application components from the full scope solution.

A runtime lifecycle state can be offered for certain business content such as the process components and process interactions between process components to support and facilitate the transition from one configuration of application components to a different configuration. The runtime lifecycle state can include multiple intermediate states or sub-states that are assigned to certain components instead of merely a binary assignment of states (active or inactive states). The use of intermediate states, as opposed to a typical binary state scheme, allows the tasks associated with activation or deactivation of the components to be performed with a minimal effect on other components in the system.

One potential benefit of the runtime lifecycle state is that changes can be efficiently applied to business applications while reducing business downtimes. Business applications may include application components modeled in software, and certain application components may be configured for a particular business scenario. The configuration of application components may be changed to include additional application components or current application components may be replaced with other components. The new application components and interfaces can require substantial preparation times before they are fully activated and integrated into an existing configuration of application components. In certain instances, lengthy business downtimes can be significantly reduced by implementing a runtime lifecycle state for certain application components. The runtime lifecycle state can allow new application components to be prepared and activated for smooth integration into a business solution.

Further, although the preparation of application components may be migrated to duplicate systems before integration into a business solution to reduce downtimes, providing for the duplicate system increases the costs of operation. The runtime lifecycle state may allow efficient integration of application components with minimal impact on the current productive system and without requiring extra resources such as additional processing for duplicate systems. Still further, changes can be made to a business solution in a generic manner without following a predefined change scenario.

The runtime lifecycle state provides flexibility to users of a modular business solution. For example, although a full business solution may involve a standard configuration of application components, the user may wish to employ a phased approach to implementation of the business solution in which the application components are incrementally activated. A phased implementation mitigates the risks associated with a full-scale business solution implementation, limits initial investment of resources, and utilizes legacy systems that may fulfill current requirements. In some instances, the phased implementation is a first step in moving toward a full scope solution. Accordingly, the runtime lifecycle state allows users to begin with a partial scope implementation and efficiently transition to a full scope solution (or a more complete partial scope implementation than previously existed).

Figure 1:
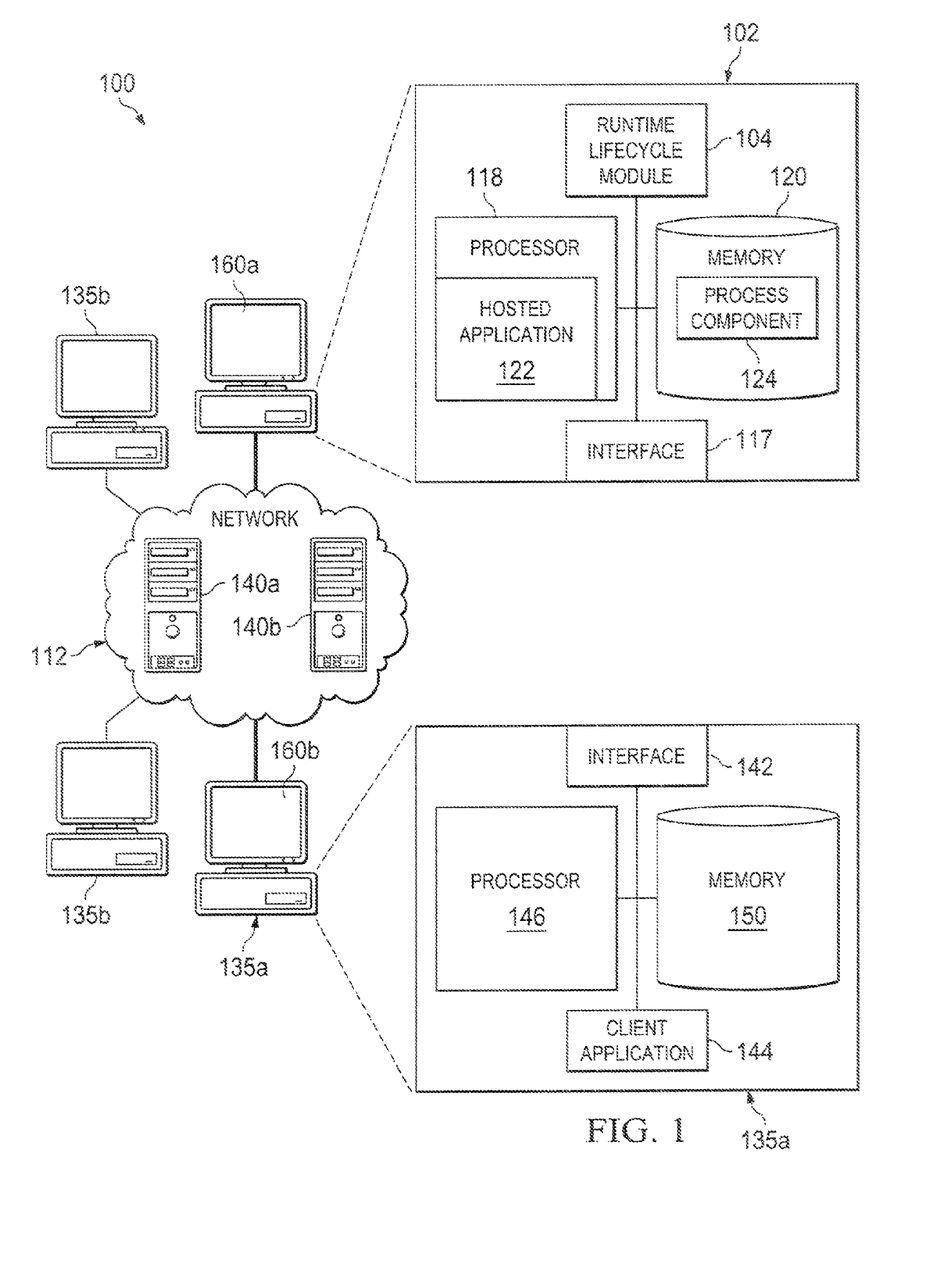
FIG. 1 illustrates an example environment implementing various features of status management for phased implementation of configuration changes in modular software applications.

Turning to the illustrated example, FIG. 1 illustrates an example environment 100 for providing a runtime lifecycle state for activation and phased implementation of application components. The illustrated environment 100 includes or is communicably coupled with server 102 and one or more clients 135, at least some of which communicate across network 112. In general, environment 100 depicts an example configuration of a system capable of providing a runtime lifecycle state for activation of application components. The environment 100 supports one or more clients 135 operable to access the server 102 or other servers 140 for hosted or on-demand services through a network. The on-demand services can be based on a hosted configuration in which the one or more servers 140 and server 102 can be logically grouped and accessible within a cloud computing network. Accordingly, the context service for providing status management for phased implementation of configuration changes may be provided to a client 135 as an on-demand solution through the cloud computing network or as a traditional server-client system.

In general, server 102 is any server that stores one or more hosted applications 122, where at least a portion of the hosted applications 122 are executed via requests and responses sent to users or clients within and communicably coupled to the illustrated environment 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122. In some instances, the server 102 may comprise a web server or be communicably coupled with a web server, where the hosted applications 122 represent one or more web-based applications accessed and executed via network 112 by the clients 135 of the system to perform the programmed tasks or operations of the hosted application 122.

At a high level, the server 102 comprises an electronic computing device operable to receive, transmit, process, store, or manage data and information associated with the environment 100. The server 102 illustrated in FIG. 1 can be responsible for receiving application requests from one or more client applications 144 or business applications associated with the clients 135 of environment 100 and responding to the received requests by processing said requests in the associated hosted application 122, and sending the appropriate response from the hosted application 122 back to the requesting client application 144. The server 102 may also receive requests and respond to requests from other components on network 112 such as other clients 135a-c in a cloud network implementation. Alternatively, the hosted application 122 at server 102 can be capable of processing and responding to local requests from a user accessing server 102 locally. Accordingly, in addition to requests from the external clients 135 illustrated in FIG. 1, requests associated with the hosted applications 122 may also be sent from internal users, external or third-party customers, other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates a single server 102, environment 100 can be implemented using one or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 118, an interface 117, a memory 120, one or more hosted applications 122, and a runtime lifecycle module 104. The interface 117 is used by the server 102 for communicating with other systems in a client-server or other distributed environment (including within environment 100) connected to the network 112 (e.g., client 135, as well as other systems communicably coupled to the network 112). Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated environment 100.

The server 102 may also include a user interface, such as a graphical user interface (GUI) 160a. The GUI 160a comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI 160a provides the particular user with an efficient and user-friendly presentation of business data provided by or communicated within the system. The GUI 160a may comprise a plurality of customizable frames or views having interactive fields, pull-down lists, and buttons operated by the user. For example, GUI 160a may provide interactive elements that allow a user to select from a list of suggested entries for input into a data field displayed in GUI 160a. More generally, GUI 160a may also provide general interactive elements that allow a user to access and utilize various services and functions of application 122. The GUI 160a is often configurable, supports a combination of tables and graphs (bar, line, pie, status dials, etc.), and is able to build real-time portals, where tabs are delineated by key characteristics (e.g. site or micro-site). Therefore, the GUI 160a contemplates any suitable graphical user interface, such as a combination of a generic web browser, intelligent engine, and command line interface (CLI) that processes information in the platform and efficiently presents the results to the user visually.

Generally, example server 102 may be communicably coupled with a network 112 that facilitates wireless or wireline communications between the components of the environment 100 (i.e., between the servers 102 140 and client 135), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the client 135 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations.

Clients 135a-c may have access to resources such as servers 140a-b and server 102 within network 112. In certain implementations, the servers 140 within the network 112, including server 102 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135 can use cloud-based services to quickly receive software upgrades, applications, and other resources that would otherwise require a lengthy period of time before the resources can be delivered to the client 135. Servers within the network 112 may also utilize the on-demand functionality of cloud-based services such as sharing data in a context provided at a server such as server 102. Additionally, other devices, such as mobile device, may also have access to cloud-based services, such as on-demand services provided by servers accessible through network 112.

As described in the present disclosure, on-demand services can include multiple types of services such as products, actionable analytics, enterprise portals, managed web content, composite applications, or capabilities for creating, integrating, and presenting business applications. For example, a cloud-based implementation can allow clients 135 to transparently upgrade from an older user interface platform to newer releases of the platform without loss of functionality. In certain implementations, an Enterprise Resource Planning (ERP) system or solution can provide an on-demand software solution for management of resources of an organization, including facilitating the flow of information between business functions associated with the organization. The ERP service can be hosted across servers or modular hardware units or reside on a centralized server and provided to clients 135*a-c* in a client-server implementation. Architectural elements of the ERP service can include process components 124. Process components 124 are reusable software packages independent of a specific application. The process components 124 realize business processes and expose the functionality of business processes as services. Each process component 124 contains one or more semantically related business objects, which typically have interfaces for exchanging messages with other business objects or process components 124. Further, each process component 124 generally is associated with one or more operations, which are separately-callable functions, described by a set of data types used as input, output, and fault parameters serving as a signature.

Other architectural elements of the ERP system include the deployment unit. A deployment unit includes one or more process components that are deployed together on a single computer system platform. Conversely, separate deployment units can be deployed on separate physical computing systems. For this reason, a deployment unit boundary defines the limits of an application-defined transaction, i.e., a set of actions that have properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components that interact with other process components or external systems only through messages, for example, as sent and received by operations, can also be replaced as long as the replacement supports the operations of the original.

In some instances, the ERP service can be implemented using a model-driven approach, and accordingly, business content, process components, business objects, and other elements can be modeled as individual entities in the ERP service. The individuals entities may be referred to as model entities. The process components can embody one or more business objects and declare on a model base the process variants that can be arranged with other process components. The process components are the main units of the engineering model in the ERP system and are of different types, including application, third party, or external process components. In particular, application process components specify Business Process Variant Types (BPVT) representing types of process flows through the process component. Each BPVT entity can specify a set of interaction roles that the BPVT entity should use when executed. The process components offer service interfaces, which in turn support interaction roles (i.e., logical services). Typically, there is one interaction role per service interface. Process component interactions define interactions between a pair of specific process components by specifying the exact service interfaces, operations, connections, and message choreography that are used in the interaction. The process component interactions also refer to a consumed interaction role, which typically identifies the party triggering the interaction, and a provided interaction role, which typically identifies the party reacting to the request.

A user may select certain process components and business objects for a particular business solution. The available process components may be contained in a business adaptation catalog that exposes the capabilities of the ERP system in business language. The business adaptation catalog can be designed to reflect the structure and dependencies in the underlying platform for the model entities. For example, the catalog may, in some instances, incorporate constraints and pre-delivered configuration settings to guide a user in the selection and activation of process components and business objects. Some example constraints applied by the business adaptation catalog can include mandatory activation of certain process components for a particular business scenario, certain process components that cannot be included in a business scope, or other parameters dictating when a process component is included or excluded from a particular business solution. The business adaptation catalog may identify certain configurations of process components for a particular business scenario using any appropriate means. In some implementations, available configurations can be presented to a user through general questions that help identify relevant business topics. The business topics represent business scenarios, which are used as conditions in business scope constraints applied throughout the business activation catalog. In other words, the ERP service can include services for performing the tasks required to identify, deploy, and activate process components and business objects for a particular business solution.

As illustrated in FIG. 1, server 102 includes a processor 118. Although illustrated as a single processor 118 in FIG. 1, two or more processors may be used according to particular needs, desires, or particular embodiments of environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of server 102 and, specifically, the one or more plurality of hosted applications 122. Specifically, the server's processor 118 executes the functionality required to receive and respond to requests from the clients 135 and their respective client applications 144, as well as the functionality required to perform the other operations of the hosted application 122.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 118 executes one or more hosted applications 122 on the server 102.

At a high level, each of the one or more hosted applications 122 is any application, program, module, process, or other software that may execute, change, delete, generate, or otherwise manage information according to the present disclosure, particularly in response to and in connection with one or more requests received from the illustrated clients 135 and their associated client applications 144 or from other servers or components through a network 112. In certain cases, only one hosted application 122 may be located at a particular server 102. In others, a plurality of related and/or unrelated hosted applications 122 may be stored at a single server 102, or located across a plurality of other servers 102, as well. In certain cases, environment 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 122 may represent web-based applications accessed and executed by remote clients 135 or client applications 144 via the network 112 (e.g., through the Internet). Further, while illustrated as internal to server 102, one or more processes associated with a particular hosted application 122 may be stored, referenced, or executed remotely. For example, a portion of a particular hosted application 122 may be a web service associated with the application that is remotely called, while another portion of the hosted application 122 may be an interface object or agent bundled for processing at a remote client 135. Moreover, any or all of the hosted applications 122 may be a child or sub-module of another software module or enterprise application (not illustrated) without departing from the scope of this disclosure. Still further, portions of the hosted application 122 may be executed by a user working directly at server 102, as well as remotely at client 135.

As illustrated, processor 118 can also execute a runtime lifecycle module 104 that provides services for applications such as hosted application 122, client application 144, or servers 140 within network 112. In some implementations, the runtime lifecycle module 104 can be executed by a different processor or server external to server 102, such as by a server communicably coupled to server 102 through network 112. For example, the runtime lifecycle module 104 may be provided as an on-demand service through a cloud computing network, as a web service accessible via network 112, or as a service provided on a dedicated server. The runtime lifecycle module 104 can provide interfaces, modules, services, or metadata definitions that enable hosted application 122 to identify and assign temporary states to model entities in order to effectively activate or deactivate the model entities with minimal business downtime. A new application component may need to be added to a current configuration of application components during, for example, a transition from a partial scope implementation to a full scope implementation. The current application components may be modeled using model entities, with the modeled relations between application elements providing the required information for system configuration. A runtime lifecycle state may be used for the model entities to support the inclusion of additional application components. The modeled relations within the application engineering model, with the runtime lifecycle state information, may be used by application services to configure the runtime portion of the application components. In some implementations, the runtime lifecycle state consists of four state variables: off, phase-in, productive, and phase-out. The runtime lifecycle state variables support the activation of business content for scenario changes such as transitioning from partial scope solutions to full scope solutions. The business content used in connection with the runtime lifecycle state can include process components, business process variant types, business objections, business features, country context, or other content types.

The runtime lifecycle module 104 may be separate from hosted application 122, while in other instances, the context module 104 may be embedded within or part of a particular one or more hosted applications. In some instances, hosted application 122 may be communicably coupled to the runtime lifecycle module 104, allowing hosted application 122 to access and take advantage of the functionality provided by the runtime lifecycle module 104. Further, runtime lifecycle module 104 may be implemented in connection with a servlet and a servlet container in server 102 or a different server communicably coupled with server 102. The servlet may be used to provide dynamic content to server 102 for receiving requests for model entities such as process components 124 and generating appropriate responses to the requests.

In general, the server 102 also includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122.

Memory 120 may also store data objects such as data objects associated with elements of an ERP system or information related to different states assigned to entities being activated or deactivated in a particular ERP solution. For example, the architectural elements of an ERP system may include process components 124, business objects, deployment units, and other modeled entities. The content used to generate user interfaces for these model entities is stored in memory 120 so that the runtime lifecycle module 104 can access the content to present the model entities to a user. Further, state information such as information concerning relationships between model entities, required configuration tasks for each model entity, historical data for the model entities including previous state information, or master data associated with the model entities may also be stored in memory 120. In other words, any data used by runtime lifecycle module 104 to determine an appropriate state to assign to each model entity to facilitate activation or deactivation of the model entities may be stored in memory 120. Still further, memory 120 may include any other appropriate data, such as VPN applications, firmware logs and policies, HTML files, data classes or object interfaces, additional software applications or sub-systems not illustrated in FIG. 1, firewall policies, a security or access log, print or other reporting files, as well as others.

The illustrated environment of FIG. 1 also includes one or more clients 135a-c. Each client 135 may be any computing device operable to connect to or communicate with at least the server 102 and/or via the network 112 using a wireline or wireless connection. Further, as illustrated in FIG. 1, client 135 includes a processor 146, an interface 142, a graphical user interface (GUI) 160b, a client application 144, and a memory 150. In general, client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes client 135a, alternative implementations of environment 100 may include multiple clients communicably coupled to the server 102, or any other number of clients suitable to the purposes of the environment 100. Additionally, there may also be one or more additional clients 135 external to the illustrated portion of environment 100 that are capable of interacting with the environment 100 via the network 112. Further, the term "client" and "user" may be used interchangeably as appropriate without departing from the scope of this disclosure. The term "client" may also refer to any computer, application, or device that is communicably coupled to one or more servers through a network 112. Moreover, while each client 135 is described in terms of being used by a single user, this disclosure contemplates that many users may use one computer, or that one user may use multiple computers.

The GUI 160b associated with client 135a comprises a graphical user interface operable to, for example, allow the user of client 135a to interface with at least a portion of the platform for any suitable purpose, such as creating, preparing, requesting, or analyzing data, as well as viewing and accessing source documents associated with business transactions. Generally, the GUI 160b provides the particular user with an efficient and user-friendly presentation of business data provided by or communicated within the system. The GUI 160b may comprise a plurality of customizable frames or views having interactive fields, pull-down lists, and buttons operated by the user. More generally, GUI 160b may also provide general interactive elements that allow a user to access and utilize various services and functions of application 144. The GUI 160b is often configurable, supports a combination of tables and graphs (bar, line, pie, status dials, etc.), and is able to build real-time portals, where tabs are delineated by key characteristics (e.g. site or micro-site). Therefore, the GUI 160b contemplates any suitable graphical user interface, such as a combination of a generic web browser, intelligent engine, and command line interface (CLI) that processes information in the platform and efficiently presents the results to the user visually.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of the server 102 (and hosted application 122) or the client 135 itself, including digital data, visual information, the client application 144, or the GUI 160b. Both the input and output device may include fixed or removable storage media such as a magnetic storage media, CD-ROM, or other suitable media to both receive input from and provide output to users of client 135 through the display, namely, the GUI 160b.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application at server 102 that can be accessed by client computer 135, in some implementations, server 102 executes a local application that features an application UI accessible to a user directly utilizing GUI 160a. Further, although FIG. 1 depicts a server 102 external to network 112 while other servers 140 are within the network 112, server 102 may be included within the network 112 as part of an on-demand context solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
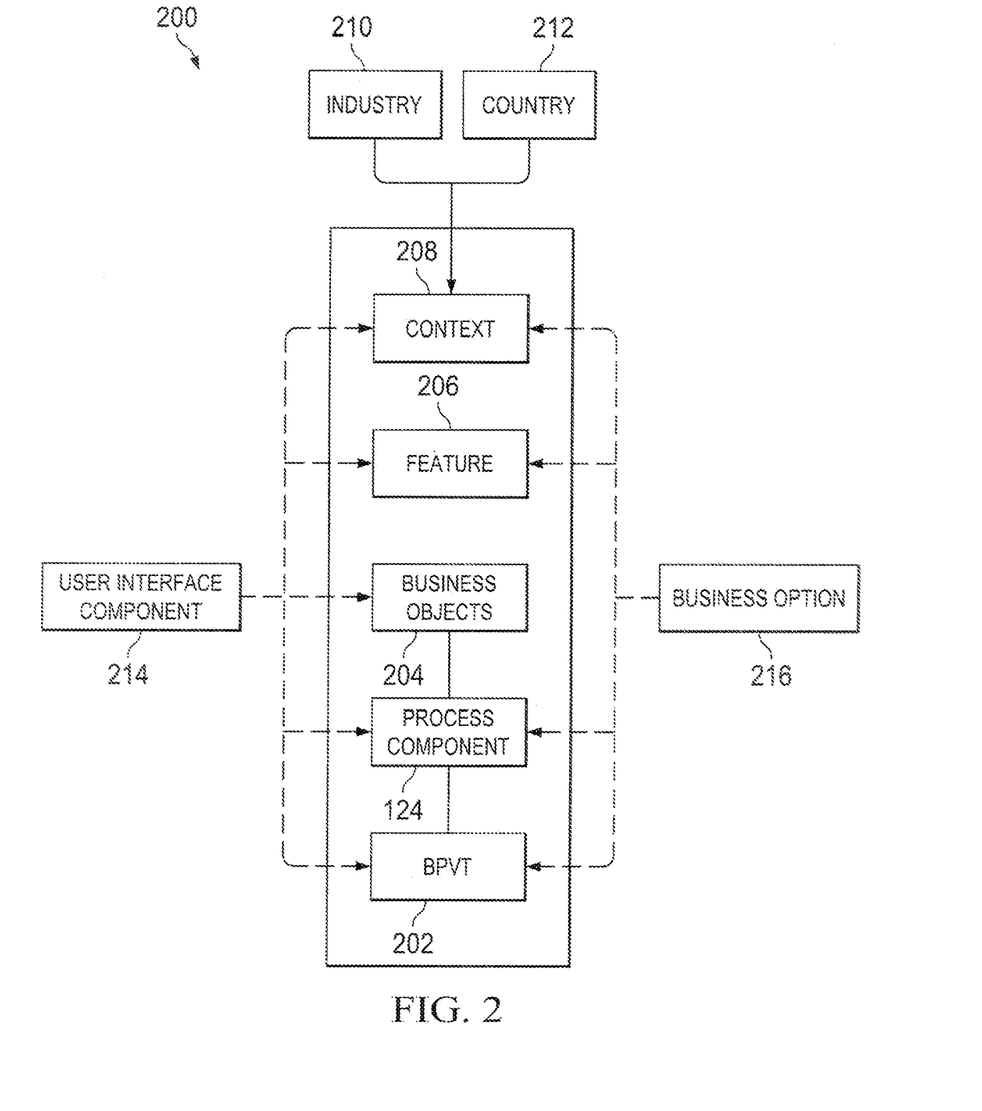
FIG. 2 depicts example model entities represented in a software model using an appropriate system, such as the system described in FIG. 1.

FIG. 2 illustrates a configuration 200 of example model entities represented in a software model. As illustrated in FIG. 2, some of the model entities for switching user interface elements can include process components 124, business process variant types (BPVT) 202, business objects 204, features (with sub-categories) 206, and a context 208. The process components 124 are used to expose the functionality of business processes as services, with each process component 124 including information regarding the variants of the business process supported by the process component 124. The business objects associated with each process component 124 can also be represented as model entities. Additionally, features 206, such as analytic features, user interface features, and business features (e.g., modeled business objection relationships), are also potential model entities. Still further, a context 208 for particular business scenarios, including the country 210, industry 212, and usage scenario information, can be represented as model entities.

Generally, as depicted in FIG. 2, the model entities can be associated in the software model and represented with user interface components 214. The user interface components 214 presented to a user depend on the model entities deployed in accordance with relevant scoping rules. For example, user interface components 214 corresponding to each of a BPVT 202, process component 124, business object 204, feature 206, or context 208 are, in some implementations, visible when their respective model entities are deployed. Conversely in some instances, when one of the BPVT 202, process component 124, business object 204, feature 206, or context 208 are unavailable, the corresponding user interface component(s) 214 may not be visible. Accordingly, users can manage the flow of information between model entities through an appropriate user interface. Additional entities, or business options 216, may be available in the business adaptation catalog. In some instances, the business options 216 include additional components associated with each of the model entities 202-208 available for selection by a user for inclusion in and further modification of the software model.

In certain implementations, a runtime lifecycle state can be assigned to the model entities depicted in FIG. 2, such as to the context 208, features 206, business objects 204, process components 124, or BPVT entity 202. Users employing a business solution can change, extend, or add to the model entities used in a business solution, which may require lengthy preparation times before full activation of certain components. As additional components are included in a business solution, the additional components typically transition directly from an "off" state to an "on" state during activation after the preparation tasks are completed. The runtime lifecycle state can introduce one or more states to a typical implementation that previously only included on/off states to facilitate the required preparation tasks without extensive business downtime.

For example, a user of an ERP system may use a package of model entities provided by the ERP system for a particular business scenario. The user may choose, however, not to use certain model entities. As an example, the user may select a set of model entities for implementation while excluding a financial services model entity. In some instances, the user may choose to perform the financial services using other methods, such as applications external to the ERP system or using a legacy system. In other words, the user may not use all the software model entities provided by an ERP system for various reasons. In particular, the user may select a specific business scope for the solution provided by the ERP system, and, based on the business scope, some model entities are included in the solution while others are not. The business scope selected by the user may be based on a predefined configuration for particular business scenarios, or the business scope may be determined for the user based on a context of the user, which may include, for example, a country or industry associated with the user. The business scope applied to the user may be associated with certain constraints that define the types of model entities included in the business solution. For example, the business scope for a particular scenario may determine what constraints apply to the model entities in a business activation catalog and thus, what model entities or business options are available to a user. During determination of the business scope, a set of active process components and BPVT entities is determined and passed to an activation engine, which activates all interaction roles that are used by the active BPVT entities.

In certain instances, the user starts with a partial scope implementation of the business solution in which one or more model entities in a particular configuration are not included in the user's implementation. The modules included in the partial scope implementation may have interfaces to access external applications or processes for the functions missing in the partial scope implementation, or, alternatively, may not implement or use functionality supplied by the missing functions. In the present example, the functionality provided in the financial services module may be substituted with external applications, and the modules used in the partial scope implementation can, for example, send financial documents or interactive forms to the external applications through the modules' interfaces.

The user may then at some point decide to switch from a partial scope implementation to a full scope use of the complete ERP system (or, alternatively, an expanded partial scope implementation with more functionality than previously provided by the partial scope implementation). The switch to the full scope implementation may require numerous preliminary tasks before all modules and processes of the system can be activated. For example, before the modules in a full scope implementation can become fully functional, additional accounts associated with the new modules may need to be set up in the ERP system, master data may need to be maintained or pre-processed, the processes in the partial scope implementation may still need to be maintained, or the functionality of the external systems may need to be phased out. A runtime lifecycle state may allow the ERP system to transition from partial scope to full scope with minimal downtimes. In some instances, a runtime lifecycle state can be integrated into the business scoping process and into configuration services for process integration, and user interface or access management.

Figure 3:
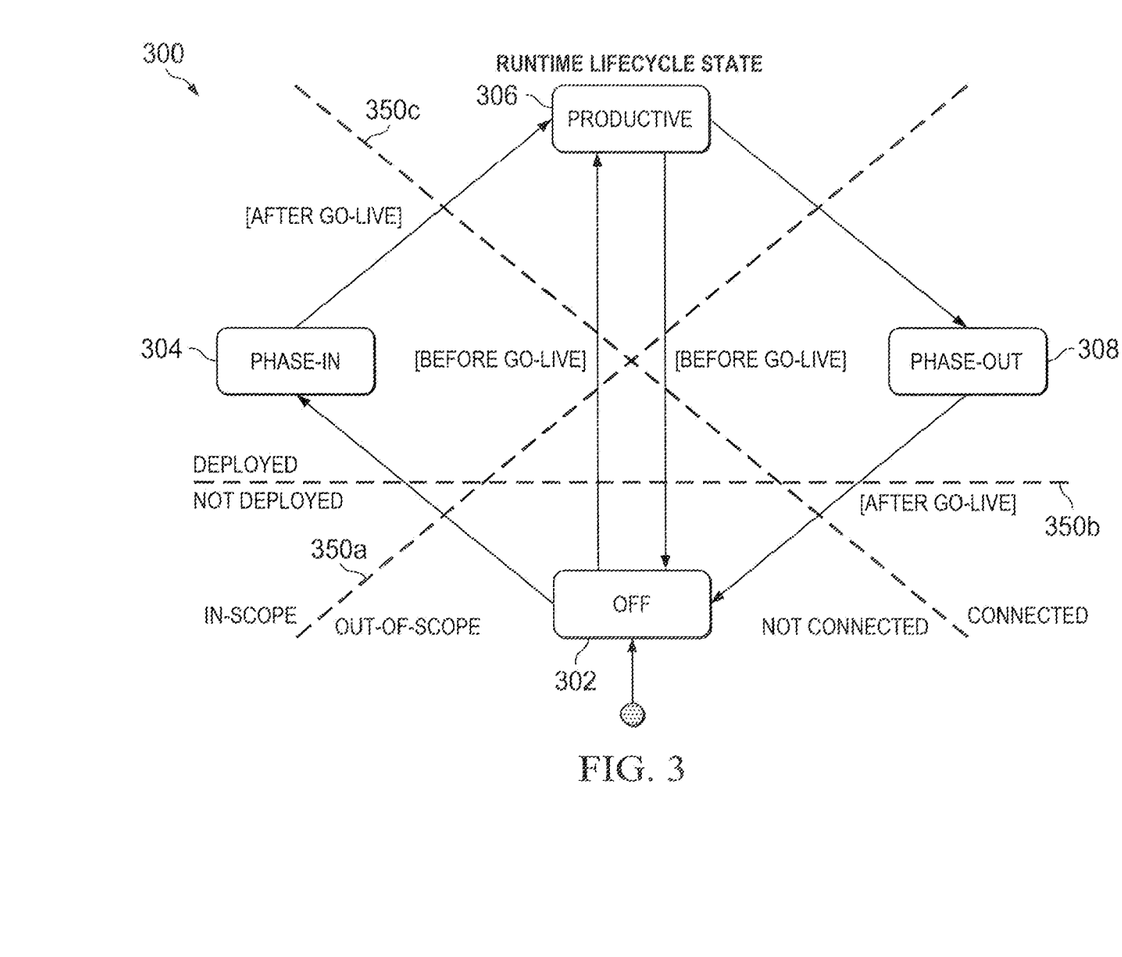
FIG. 3 depicts an example state chart diagram of the various states associated with a model entity provided by an appropriate system, such as the system described in FIG. 1.

FIG. 3 depicts an example state chart diagram 300 of the various states associated with a model entity provided by an appropriate system. The runtime lifecycle state may include four state variables: Off 302, Phase-in 304, Productive 306, and Phase-out 308. Additional intermediate states between the off and productive states may also be included and are within the scope of the present disclosure. The runtime lifecycle state can be available for or associated with some or all of the entities in the engineering model, including process components, BPVT entities, process component interactions, agents, service interfaces, and other model entities. Different services react to or interpret the states differently. A particular model entity such as a process component 124 may begin in an Off state 302. The Off state 302 represents an initial state of the process component 124, such as when a process component 124 is initially excluded from an ERP system during a partial scope implementation. In some instances, model entities such as process components 124 initially begin in the Off state 302. Turning to the illustrated example, the particular process component 124 may be selected by a user for inclusion in the ERP solution based on a particular business scope. In some implementations, a business adaptation catalog includes business scoping options, and modeled constraints can be used to determine application entities that correspond to a selected business scope. The connections between a process component and corresponding BPVT entities can be modeled in the business adaptation catalog. In other words, based on a user's selection of a particular business scope, certain model entities may be automatically identified through the business adaptation catalog for inclusion in or exclusion from a business solution. Alternatively, some process components specifically designed for a particular use, such as process components without BPVT entities, can be freely selected or unselected by the user.

The selection of the process component 124 for inclusion in a particular business scope results in transitioning of the process component 124 into the in-scope region in FIG. 3 (i.e., to the left of line 350a). That is, from the perspective of the business adaptation catalog, the process component to be activated is now considered "in-scope" as it transitions to the left of line 350a, and the former entity used to perform the functionality of (and being replaced by) the process component 124 is now "out-of-scope" (as illustrated to the right of line 350a). Further, the business adaptation catalog can include constraints on which model entities need to be activated or identified as "in-scope" depending on the status of other model entities. For example, if a particular process component is not "in-scope," the constraints may specify that none of the process component's provided interaction roles are active, and each corresponding process component interaction and process agent is also inactive.

If the process component 124 is part of an initialization process involving activation of all model entities in a business solution before any of the model entities are active, the process component 124 is transitioned directly to the Productive state 306 after initial tests and preparation have been performed. If, however, some model entities are currently active, and the process component 124 is being activated to extend the current solution, intervening states provided by the runtime lifecycle module 104 may be needed to effectively transition the process component 124 from an off state to a productive state. Accordingly, if the new process component 124 is part of the extension from a partial scope implementation to a full scope implementation, the new process component's state may be transitioned from an Off state 302 to a Phase-in state 304. Phase-in state 304 can be a state that indicates that the process component 124 is a newly introduced process component 124 in a change scenario. The Phase-in state or status 304 can be interpreted in different ways by various configuration services. For example, the configuration service can apply all configuration settings and privileges to the newly introduced component that are required for preparation of master data for the new process component. A user interface configuration service can enable user interface components that are required in the preparation phase, while an access management service can grant limited access to the new process component. Accordingly, from the perspective of the configuration and user interface services, the process component 124 is considered to be deployed (as illustrated above line 350b) as the configuration services prepare the process component 124 to be activated, as illustrated in FIG. 3.

After the new process component 124 has been prepared to be activated, it can be connected, as illustrated to the right of line 350c, with other process components that are already in the Productive state 306 or that are concurrently being phased-in. The new process component can then transition into a fully Productive state 306 after it is phased-in. After the Productive state 306 is triggered, configuration services can apply any remaining configuration settings to the new process component as well as to other connected process components. For example, user interface components that were hidden during the preparation phase can be enabled, and the process integration for the new process component can be switched on.

In some instances, the new process component is activated in order to replace an existing process component, for example. Accordingly, a Phase-out state or status 308 can also be assigned to model entities as depicted in FIG. 3. The process component to be replaced begins in a Productive state 306, but after a change project is initiated to replace the process component, the process component is considered "out-of-scope" when located to the right of line 350a. After successful completion of the change project, the process component is assigned a Phase-out state 308. The Phase-out state or status 308 can be interpreted in different ways by various configuration services. In the preparation phase, it will typically have no influence on existing configuration services because business documents may still be processed by the process component being replaced. After the new process component has been assigned a Productive state 306 and has fully replaced the existing process component, the Off state 302 is then triggered for the existing process component that is now obsolete.

The transition of model entities to different states can be based on completion of steps, or milestones, during preparation of the model entities for activation. For example, a milestone may be the completion of a task such as maintaining all master data. Once the milestone has been reached, certain model entities that are presently in a Phase-in state 304 are switched to the Productive state 306, while model entities that are in a Phase-out state 308 can be transitioned to an Off state. As illustrated in FIG. 3, relevant milestones can include a "go-live" milestone. Before the "go-live" milestone has been reached, business documents such as invoices and quotations are created for test purposes. After the "go-live" milestone is reached, legal (or actual) business documents are created, and previous test documents can be discarded. Once the "go-live" milestone is reached, change projects or change scenarios can be required to significantly extend the system scope. Here, the Phase-in state 304 and Phase-out state 308 are used to concurrently allow creation of legal documents and changing of the communication channels for processing these documents. Accordingly, certain milestones or completed tasks can act as trigger points to move a model entity to a different state.

Figure 4A:
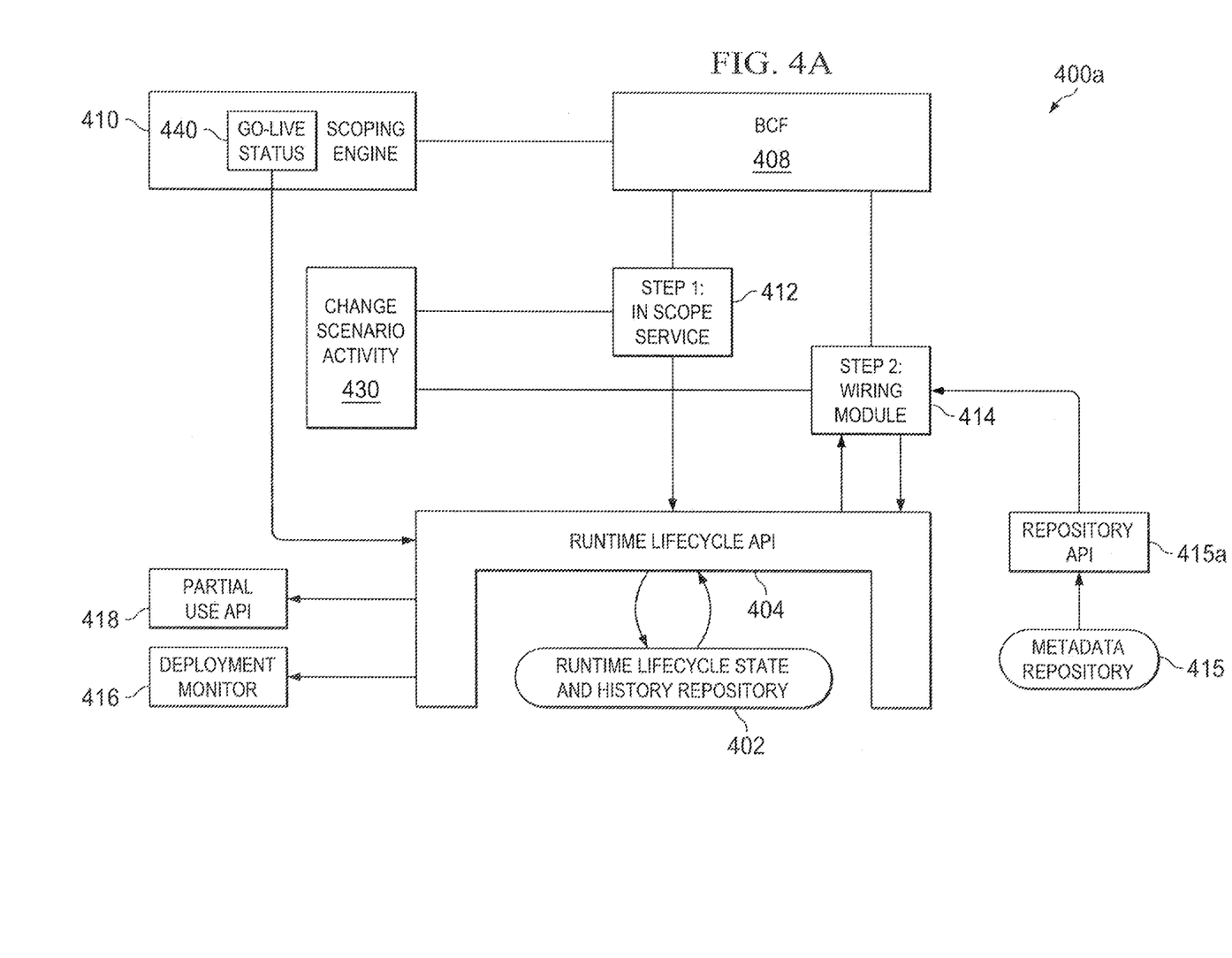
FIG. 4A depicts a first example configuration of a runtime lifecycle application programming interface coupled with various components for providing or consuming a runtime lifecycle state using an appropriate system, such as the system described in FIG. 1.
Figure 4B:
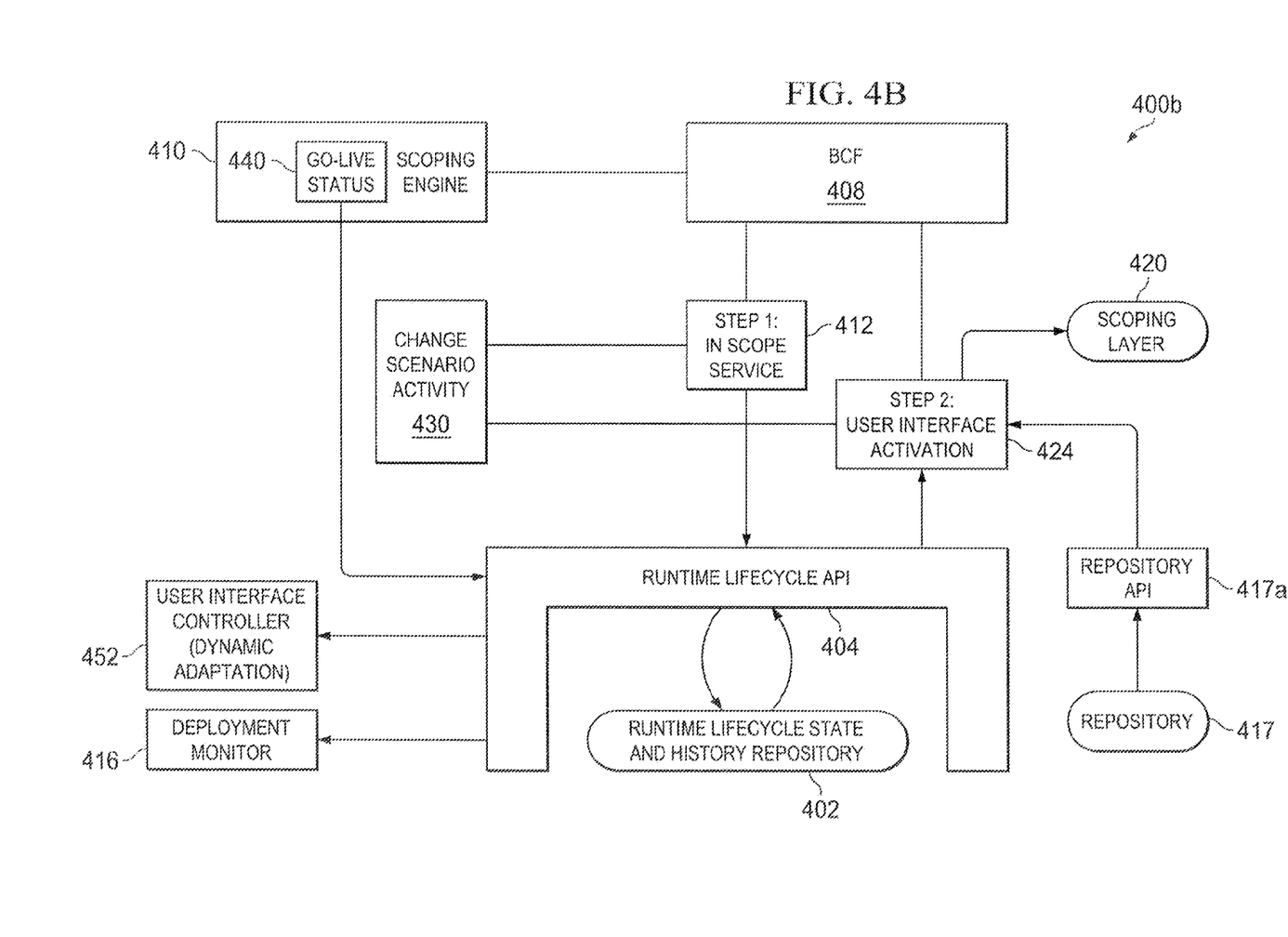
FIG. 4B depicts a second example configuration of a runtime lifecycle application programming interface coupled with various components for providing a runtime lifecycle state using an appropriate system, such as the system described in FIG. 1.
Figure 4C:
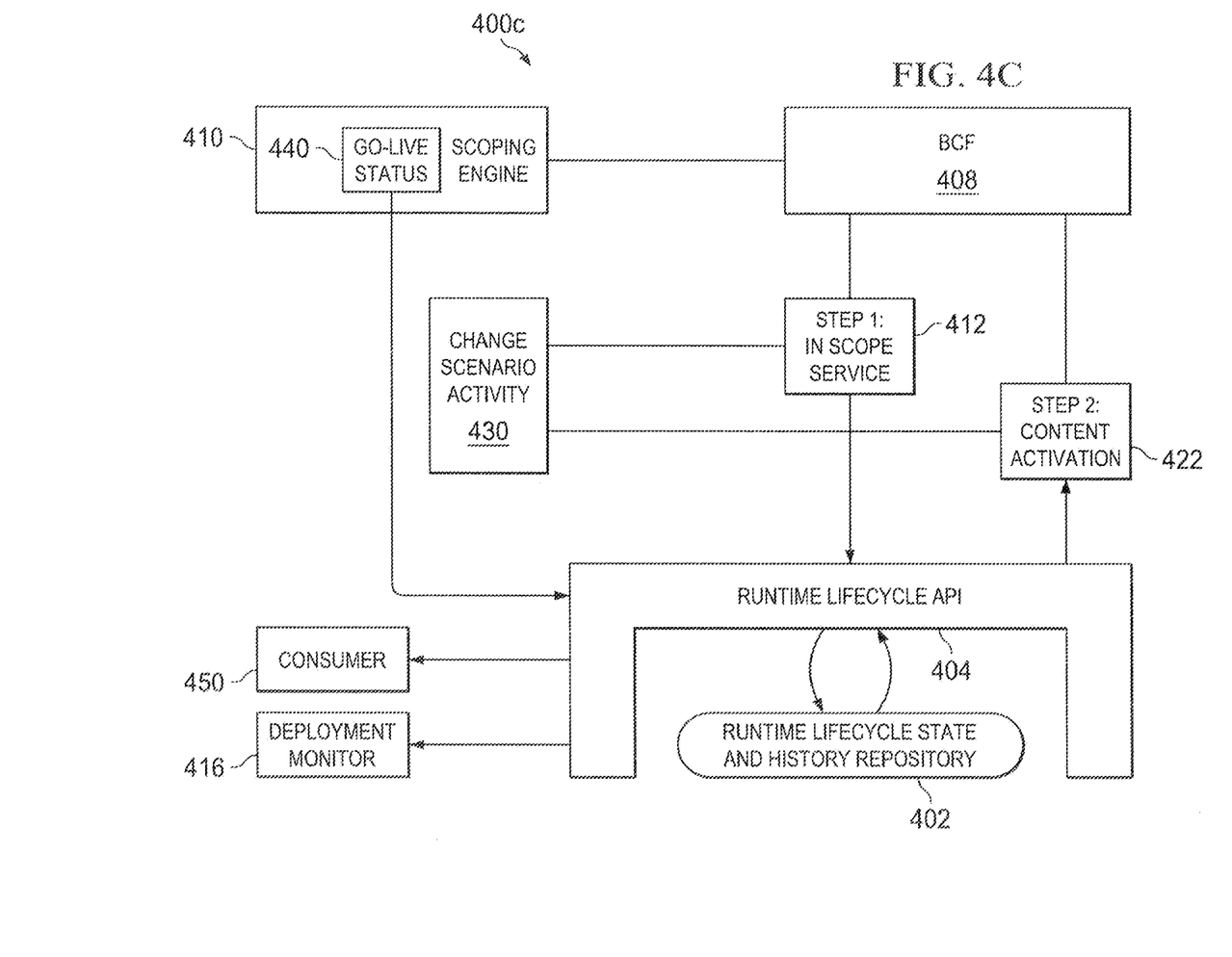
FIG. 4C depicts a third example configuration of a runtime lifecycle application programming interface coupled with various components for providing a runtime lifecycle state using an appropriate system, such as the system described in FIG. 1.

FIGS. 4A-C illustrate an example configuration 400 of a runtime lifecycle application programming interface (API) 404 coupled with various components for providing a runtime lifecycle state. The rectangular boxes represent agents and rounded boxes are data stores. FIG. 4A depicts a first example configuration 400 involving the runtime lifecycle API 404 used in an application-to-application communication configuration. An application-to-application communication can consist of a web service communication between applications that can be de-coupled from each other. The application-to-application communications are used across process component boundaries to operate different process components on different systems. As seen in FIG. 4A, a database 402 may store information associated with the runtime lifecycle state and history. The information can include a history of the state of various model entities such as business objects or process components, the history providing such information including when the model entity was first activated, phased in, or phased out. An application programming interface (API) 404 can be used to access and set the information stored in the runtime lifecycle state and history repository 402. In the present example, the API can comprise any program, module, or text that interfaces with the runtime lifecycle repository 402 and allows external components to communicate with and access the runtime lifecycle repository 402. Also depicted in FIG. 4 is a scoping engine 410, which is a software module that controls operations in response to decisions made by the user. The scoping engine 410 can, for example, control the steps taken to initialize a changed object for activation after a user selects a particular business scope for implementation of a business solution.

The scoping engine 410 can be connected to a business configuration framework (BCF) 408, which provides the necessary services and information necessary to orchestrate service providers that perform configuration tasks such as creating web service connections for application to application communication. For example, a particular process component may be identified for activation by the scoping engine 410 based on selection of a business scope by a user. The business configuration framework (BCF) 408 triggers configuration service providers that need to react on the newly activated process component and may use the Runtime Lifecycle API 404 to access scoping information needed to perform necessary configuration tasks in connection with the activated process component. The service providers may react differently based on the runtime lifecycle state associated with the process component.

In certain implementations, additional components, such as the In-Scope Service 412 depicted in FIG. 4A, can provide a service for determining which associated software model entities have a new runtime state based on the scoping decision in the catalog. The In-Scope Service 412 can obtain the appropriate state for a particular model entity given a particular scoping decision to allow other modules, such as Wiring Module 414, to perform required configuration tasks. Additional model information can be requested from a metadata repository API 415*a*. Specifically, the In-Scope Service 412 can obtain a list of content objects and set a state for the objects based on various constraints in the engineering model associated with the ERP system and on the present system state. For example, the In-Scope Service 412 can receive a list of BPVT entities or process components to be activated. In some implementations, the parent process component for each BPVT entity can also be determined and added to the list of in-scope process components. Based on the current state of the system, the runtime lifecycle state for the BPVT entities or process components is determined. A similar process may be performed by the In-Scope Service 412 for deactivation of model entities. In certain instances, the runtime lifecycle state can also be affected by whether a particular process component contains BPVT entities.

The Wiring Module 414 in FIG. 4A can be used during application-to-application activation to create or remove required web service shortcuts for cross deployment unit processes. Application-to-application connections (web service or direct connections) are configured by the Wiring Module 414 in FIG. 4A. In particular, the Wiring Module 414 can call the Repository API 415*a* to retrieve process component interactions that are to be created and agents that are to be activated from the metadata repository 415. The Wiring Module 414 can be configured to create or delete connections, activate or deactive agents as required or indicated, or to call the runtime lifecycle API 404 to set the runtime lifecycle state for agents and interactions to a productive state or an off state. Further, the Wiring Module 414 also checks whether all connections needed for a given BPVT entity and the current process component settings are correctly configured and if all required agents are active.

The In-Scope Service 412 and Wiring Module 414 can be called in connection with a Change Scenario Activity 430. Change scenarios can include a guided activity list that leads a user through the steps required for scope extension or scope reduction after a "go-live" milestone. In some instances, the runtime lifecycle API 404 can be coupled to additional tools or modules. For example, a deployment monitor 416 can be used to monitor the model entities or modules associated with the runtime lifecycle API 404, such as to determine the model entities that are in-scope and out-of-scope or to monitor any deviations in tasks performed by various modules. A Partial Use API 418 can be included to resolve potential inconsistencies that may arise when transitioning from a partial scope implementation to a full scope implementation. For example, in a partial scope implementation, some of the functionality usually provided by a model entity within an ERP system may be outsourced to external sources. In certain instances, an external application may generate a business document, which may not be visible to modules within the ERP system. If the partial scope implementation is later expanded to a full scope implementation in which the external functionality is now provided by a module within the ERP system, the business document created by the external application may need to be identified or adapted for use within the ERP system. Accordingly, a Partial Use API 418 software module can be used to track the history of documents created during partial use implementations and monitor whether a particular document was created in a partial scope or full scope implementation.

Other configurations with different components can be used with the runtime lifecycle API 404. For example, as illustrated in a second example configuration 400*b* of FIG. 4B, the runtime lifecycle API 404 can also be used in a configuration for user interface activation. A user interface activation service 424 evaluates the scoping rules associated with the user interface components, expressed as model entities, having the states Phase-in, Productive, or Phase-out. Various user interfaces may be stored in a repository 417, which may be accessed through a repository API 417*a*. The repository 417 can, in some implementations, store user interface models and provide features such as layering and versioning. For example, a layer can be provided by the repository 417 for scoping, which contains logical deletions of elements that are not in the present scope. The user interfaces can be associated with the model entities in a particular ERP solution. A scoping layer 420 is generated from a user interface activation service 424 to provide a filtered view on all available user interfaces. The user interface activation service 424 can select the user interface components associated with certain entities, calculate the visibility of the entities with respect to user interface elements such as tabs, views, and buttons, and generate the content for the scoping layer in the repository. In addition, the authorization to use individual user interfaces can also be generated by the user interface activation service 424. Alternatively, individual user interface controllers 452 can read the runtime lifecycle state to set dynamic UI attributes.

Further, FIG. 4C depicts a general configuration 400*c* for content activation using the runtime lifecycle API 404. A consumer 450 or deployment monitor 416 can request data from the Runtime Lifecycle State and History Repository 402 through a Runtime Lifecycle State API 404. A Change Scenario Activity 430 can call the In-Scope Service 412 or Content Activation Service 422. The information related to the current state of the model entities is obtained and used during configuration time to perform content activation using the content activation service 422.

Figure 5:
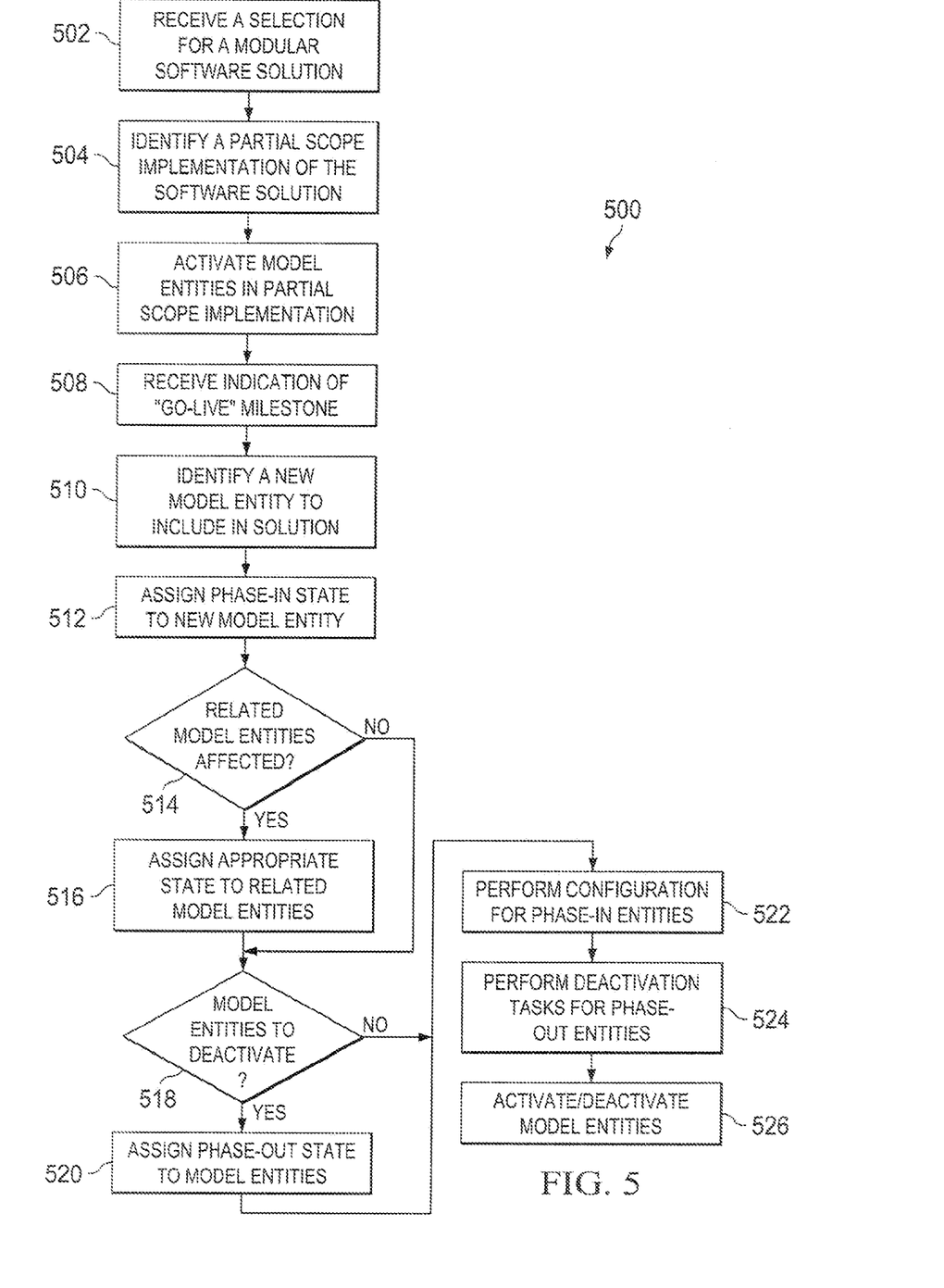
FIG. 5 is a flowchart of an example process for adding a model entity to a partial scope implementation using a runtime lifecycle state provided by an appropriate system, such as the system described in FIG. 1.

FIG. 5 depicts an example process 500 for adding a model entity to a partial scope implementation using a runtime lifecycle state. First, a selection for a modular software solution is received from a user at 502. The modular software solution can include a standard configuration of model entities such as deployment units, process components, business objects, and connections between process components. The configuration constraints of the software solution determine the business functionality included in the configuration. Typically, a particular solution is designed for a specific business scenario and involves a set number of model entities or modules. A partial scope implementation of the software solution, however, can be identified at 504. The partial scope implementation comprises an implementation of the software solution that is limited to the use of certain applications. Accordingly, not all the model entities in the standard configuration (full scope implementation) are used in the partial scope implementation. For example, the full scope implementation of the solution may include a financial model entity which may be excluded from the partial scope implementation because an external or legacy process may perform the required financial tasks.

The model entities in the partial scope implementation are activated at 506. Activation of model entities can include performing configuration tasks associated with the model entities. During initial startup of a partial scope implementation (or full scope implementation), model entities can transition directly from an off state to a productive state without the need for a transition state because the model entities are collectively activated without the need to account for previously activated model entities. After the model entities in the partial scope implementation have been activated, an indication that a "go-live" milestone has been achieved is received at 508. A "go-live" milestone can be an indication that an initial stage of a software solution is being transitioned into an active stage, such as when previous test documents are discarded and legal business documents are created. After the "go-live" milestone, a new model entity is identified to include in the software solution at 510. In some instances, the new model entity is a model entity that was originally included in the standard configuration (full scope implementation) of the software solution but was omitted from the partial scope implementation. Moreover, multiple model entities can be identified for inclusion in the software solution at 510. For example, all remaining model entities, or a subset of the remaining model entities, of the standard configuration can be included in the software. The new model entity is assigned a phase-in state at 512. As described in connection with FIG. 3, the phase-in state allows configuration tasks to be performed on the new model entity before the model entity is fully activated while currently activated model entities in the partial scope implementation continue in a productive state or are configured in response to inclusion of the new model entity.

The phase-in state is interpreted differently by different configuration services. If there are related model entities in the partial scope implementation affected by the assignment of the phase-in state to the new model entity at 514, then the related model entities can also be designated for configuration after an appropriate state is assigned to the related model entities at 516. The related model entities can also be assigned a phase-in state for required configuration tasks similar to the configuration of the new model entity. For example, in some instances, a parent process component of a BPVT entity may need to be activated if the BPVT entity is identified as in-scope in the partial scope implementation. Next, or if there are no related model entities affected, it is determined whether there are model entities to be deactivated at 518. During a change project scenario, new model entities can be added to the partial scope implementation and current model entities can be removed, such as when a new model entity replaces a current model entity. If there are model entities to be deactivated, a phase-out state can be assigned to those model entities at 520. If there are no model entities to be deactivated, and once the appropriate states are assigned to the respective model entities, configuration services can perform configuration tasks for model entities having a phase-in state at 522 and deactivation tasks with respect to model entities that are being phased out at 524. After the model entities are configured, the model entities having a phase-in state can be activated and the model entities having a phase-out state can be deactivated at 526.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, although the transition from a partial scope implementation to a full scope implementation can be performed in one step, a transition comprising multiple stages in which additional model entities are incorporated into a business solution at each stage is also within the scope of the present disclosure.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for managing a runtime lifecycle state, the method comprising the following operations:

receive a selection for a modular software solution, the modular software solution including a plurality of model entities, wherein the selection for a modular software solution also includes a scope of the modular software solution;

identify a partial implementation of the modular software solution comprising a subset of the plurality of model entities according to the scope;

activate the subset of the plurality of model entities to a phase-in state as the partial implementation;

identify a particular model entity from the plurality of model entities to add to the partial implementation, the identification of the particular model entity following an indication that a milestone has been achieved, the milestone indicating that an initial state of the modular software solution is transitioning into an productive state from the phase-in state, and wherein the particular model entity extends the scope of the plurality of model entities;

transition the particular model entity to a temporary phase-in state, the temporary phase-in state providing an indication to at least one configuration service to perform at least one pre-activation task for the particular model entity;

perform the at least one pre-activation task for the particular model entity; and activate the particular model entity after the pre-activation task is completed and transition the particular model entity to a productive state.

2. The method of claim 1 further comprising the following operations:

identify a second model entity in the subset of the plurality of model entities for deactivation;

assign a temporary phase-out state to the second model entity, the temporary phase-out state providing an indication of at least one deactivation task to be performed on the second model entity; and deactivate the second model entity after the at least one deactivation task is completed.

3. The method of claim 1 further comprising the following operations:
- identify remaining model entities from the plurality of model entities to add to the partial implementation;
- assign a temporary phase-in state to the remaining model entities, the temporary phase-in state providing an indication of at least one pre-activation task to be performed each of the remaining model entities; and
- activate the remaining model entities after the pre-activation task is completed.

4. The method of claim 1, wherein the subset of the plurality of model entities to be included in the partial implementation is determined based on a business scope, the business scope determined based on at least one of a country associated with a user, an industry associated with a user, or a predefined business scope available to a user.

5. The method of claim 1, wherein the pre-activation task includes at least one of applying configuration settings to the particular model entity, enabling user interface components of the particular model entity, setting up connections between applications, or defining access rules for the particular model entity.

6. The method of claim 1 further comprising the following operations:
- identify at least one model entity in the subset of the plurality of model entities that requires a change of state in response to identification of the particular model entity to add to the partial implementation; and
- assign a state to the at least one model entity based on a current state of the at least one model entity and a relationship of the at least one model entity with the particular model entity.

7. The method of claim 1 wherein the plurality of model entities include at least one of a process component or a business process variant type.

8. The method of claim 1 wherein the particular model entity is not included in the subset of the plurality of model entities.

9. A computer program product encoded on a tangible, non-transitory storage medium, the product comprising computer readable instructions for causing one or more processors to perform operations comprising:
- receiving a selection for a modular software solution, the modular software solution including a plurality of model entities, wherein the selection for a modular software solution also includes a scope of a modular software solution;
- identifying a partial implementation of the modular software solution comprising a subset of the plurality of model entities according to the scope;
- activating the subset of the plurality of model entities to a phase-in state as the partial implementation;
- identifying a particular model entity from the plurality of model entities to add to the partial implementation, the identification of the particular model entity following an indication that a milestone has been achieved, the milestone indicating that an initial state of the modular software solution is transitioning into an productive state from the phase-in state, and wherein the particular model entity extends the scope of the plurality of model entities;
- transitioning the particular model entity to a temporary phase-in state, the temporary phase-in state providing an indication to at least one configuration service to perform at least one pre-activation task for the particular model entity;
- perform the at least one pre-activation task for the particular model entity; and
- activating the particular model entity after the pre-activation task is completed and transitioning the particular model entity to a productive state.

10. The computer program product of claim 9, further comprising computer readable instructions for causing the one or more processors to perform operations comprising:
- identifying a second model entity in the subset of the plurality of model entities for deactivation;
- assigning a temporary phase-out state to the second model entity, the temporary phase-out state providing an indication of at least one deactivation task to be performed on the second model entity; and
- deactivating the second model entity after the deactivation task is completed.

11. The computer program product of claim 9, wherein activating the particular model entity includes assigning a productive state to the particular model entity.

12. The computer program product of claim 9, wherein the subset of the plurality of model entities to be included in the partial implementation is determined based on a business scope associated with a user, the business scope determined based on at least one of a country associated with a user, an industry associated with a user, or a predefined business scope available to a user.

13. The computer program product of claim 9, wherein the pre-activation task includes at least one of applying configuration settings to the particular model entity, enabling user interface components of the particular model entity, or defining access rules for the particular model entity.

14. The computer program product of claim 9, wherein the plurality of model entities include at least one of a process component or a business process variant type.

15. The computer program product of claim 9, wherein the particular model entity is not included in the subset of the plurality of model entities.

16. A system, comprising:
- one or more processors interoperably coupled to a memory and configured to:
  - receive a selection for a modular software solution, the modular software solution including a plurality of model entities, wherein the selection for a modular software solution also includes a scope of the modular software solution;
  - identify a partial implementation of the modular software solution comprising a subset of the plurality of model entities according to the scope;
  - activate the subset of the plurality of model entities to a phase-in state as the partial implementation;
  - identify a particular model entity from the plurality of model entities to add to the partial implementation, the identification of the particular model entity following an indication that a milestone has been achieved, the milestone indicating that an initial state of the modular software solution is transitioning into an productive state from the phase-in state, and wherein the particular model entity extends the scope of the plurality of model entities;
  - transition the particular model entity to a temporary phase-in state, the temporary phase-in state providing an indication to at least one configuration service to perform at least one pre-activation task for the particular model entity;
  - perform the at least one pre-activation task for the particular model entity; and activate the particular model entity after the pre-activation task is completed and transition the particular model entity to a productive state.

17. The system of claim 16, wherein the one or more processors are further configured to:
identify at least one model entity in the subset of the plurality of model entities that requires a change of state in response to identification of the particular model entity to add to the partial implementation; and
assign a state to the at least one model entity based on a current state of the at least one model entity and a relationship of the at least one model entity with the particular model entity.

18. The system of claim 16, wherein the plurality of model entities include at least one of a process component or a business process variant type.

19. The system of claim 16, wherein the one or more processors are further configured to:
identify a second model entity in the subset of the plurality of model entities for deactivation;
assign a temporary phase-out state to the second model entity, the temporary phase-out state providing an indication of at least one deactivation task to be performed on the second model entity; and
deactivate the second model entity after the at least one deactivation task is completed.

20. The system of claim 16, wherein the one or more processors are further configured to:
identify remaining model entities from the plurality of model entities to add to the partial implementation;
assign a temporary phase-in state to the remaining model entities, the temporary phase-in state providing an indication of at least one pre-activation task to be performed each of the remaining model entities; and
activate the remaining model entities after the pre-activation task is completed.

* * * * *